United States Patent
Hufenbach et al.

(10) Patent No.: US 10,427,452 B2
(45) Date of Patent: Oct. 1, 2019

(54) WHEEL RIM WITH A RIM BASE MADE OF FIBER COMPOSITE MATERIAL AND METHOD OF MANUFACTURE

(71) Applicant: THYSSENKRUPP CARBON COMPONENTS GMBH, Wilsdruff STT Kesselsdorf (DE)

(72) Inventors: Werner Hufenbach, Dresden (DE); Martin Lepper, Dresden (DE); Jens Werner, Coswig (DE); Christian Koehler, Dresden (DE)

(73) Assignee: THYSSENKRUPP CARBON COMPONENTS GMBH, Wilsdruff STT Kesselsdorf (DE)

( * ) Notice: Subject to any disclaimer, the term of this patent is extended or adjusted under 35 U.S.C. 154(b) by 143 days.

(21) Appl. No.: 14/362,693

(22) PCT Filed: Dec. 5, 2012

(86) PCT No.: PCT/DE2012/100370
§ 371 (c)(1),
(2) Date: Jun. 4, 2014

(87) PCT Pub. No.: WO2013/083123
PCT Pub. Date: Jun. 13, 2013

(65) Prior Publication Data
US 2014/0333121 A1     Nov. 13, 2014

(30) Foreign Application Priority Data
Dec. 7, 2011    (DE) ........................ 10 2011 120 361

(51) Int. Cl.
*B60B 3/04*        (2006.01)
*B60B 5/02*        (2006.01)
*B29C 70/46*     (2006.01)

(52) U.S. Cl.
CPC ............ *B60B 3/044* (2013.01); *B29C 70/462* (2013.01); *B60B 3/041* (2013.01); *B60B 5/02* (2013.01);
(Continued)

(58) Field of Classification Search
CPC .... B60B 3/04; B60B 5/00; B60B 5/02; B60B 5/04; B60B 2360/34; B60B 2360/341; B60B 2360/3462; B60B 2360/3464
See application file for complete search history.

(56) References Cited

U.S. PATENT DOCUMENTS 1,561,766 A  *   11/1925   Atwood .................... B60B 5/02
                                                                          152/6
1,594,717 A  *   8/1926   Forsyth .................... B60B 5/02
                                                                          301/64.6

(Continued)

FOREIGN PATENT DOCUMENTS

DE           692 07 341 T      6/1996
DE    20 2005 004 399 U      6/2005
(Continued)

*Primary Examiner* — Frank B Vanaman
(74) *Attorney, Agent, or Firm* — thyssenkrupp North America, Inc.

(57) ABSTRACT

The invention relates to a wheel rim having a rim base (3) of fiber composite material and a wheel disk (2) connected to the rim base (3) in a radial marginal section. The radial marginal section of the wheel disk (2) comprises at least two partial layers (4, 5) on each of which a contoured joining zone (6, 7) which extends substantially axially is formed, the joining zone being flat connected to the rim base (3).

17 Claims, 7 Drawing Sheets

(52) U.S. Cl.
CPC ..... *B60B 2310/30* (2013.01); *B60B 2310/318* (2013.01); *B60B 2360/141* (2013.01); *B60B 2360/36* (2013.01); *B60B 2900/311* (2013.01); *Y10T 156/1002* (2015.01)

(56) References Cited

U.S. PATENT DOCUMENTS

| | | | | |
|---|---|---|---|---|
| 4,036,080 | A | * | 7/1977 | Friedericy ............... F16C 15/00 156/74 |
| 4,514,013 | A | * | 4/1985 | Woelfel ................. B29C 53/60 301/64.703 |
| 4,749,235 | A | * | 6/1988 | McDougall ............. B60B 5/02 301/64.703 |
| 6,123,353 | A | * | 9/2000 | Bennett ................. B62K 19/16 280/281.1 |
| 7,309,110 | B2 | * | 12/2007 | Vernet ..................... B60B 5/02 152/516 |
| 2002/0108249 | A1 | * | 8/2002 | Meggiolan ........... B29C 70/446 29/895.3 |
| 2003/0189373 | A1 | | 10/2003 | Spoelstra |
| 2005/0143203 | A1 | * | 6/2005 | Souders ................. A63B 59/51 473/564 |
| 2007/0205654 | A1 | * | 9/2007 | Denk ....................... B60B 5/02 301/95.102 |
| 2011/0217160 | A1 | | 8/2011 | McMillan |
| 2013/0071574 | A1 | * | 3/2013 | Allison ................ B62D 29/004 427/427.4 |

FOREIGN PATENT DOCUMENTS

| | | |
|---|---|---|
| DE | 601 15 290 T | 7/2006 |
| DE | 102005041940 A1 | 3/2007 |
| DE | 10 2006 051 867 A | 5/2008 |
| DE | 102010010512 A1 | 9/2011 |
| DE | 102010010513 | 9/2011 |
| DE | 102011114358 B3 | 3/2013 |
| DE | 102011120361 A1 | 6/2013 |
| EP | 2363271 A1 | 9/2011 |
| EP | 2363272 A1 | 9/2011 |
| JP | S5527112 A | 2/1980 |
| WO | 0220252 A1 | 3/2002 |

* cited by examiner

Fig. 3
Detail X

**Fig. 5
Detail Y**

Fig. 6

Arranging wheel disk or partial layers thereof (optionally as preform prefabricated from fibrous material) between part tools of rim base-reproducing mold

↓

Molding wheel disk or partial layers thereof onto part tools through sections of partial layers extending beyond part tools, molded sections forming axially extending, contoured joint zones

↓

[Optionally, inserting profiled supporting core in interspace between partial layers molded to part tools]

↓

Fixing joint zones by deposition of fibrous material in form fit to preform of rim base

WHEEL RIM WITH A RIM BASE MADE OF FIBER COMPOSITE MATERIAL AND METHOD OF MANUFACTURE

BACKGROUND OF THE INVENTION

1. Field of the Invention

The invention relates to a wheel rim having a rim base made of fiber composite material and a wheel disk, wherein the wheel disk is connected to a radial marginal area with the rim base.

The invention also relates to a method for manufacturing a wheel rim.

2. Discussion of Background Information

Wheel rims, in particular in the automotive sector, are made at least partially of fiber composite material due to lightweight requirements. Wheel rim components, such as the rim base and wheel disk, are prefabricated in separate parts from different materials according to specific requirements and then assembled together. This way the separate parts are joined together at specially formed joint zones, wherein the joint must withstand considerable loads.

Connections of the rim bed made of fiber composite material with a wheel disk are known from printed publication DE 10 2010 010 512 A1, in which the joints are advantageously formed by interlocking undercuts of the rim base contour with the contour of the radial marginal area of the wheel disk. In the method known from the above-mentioned printed publication for manufacturing the component from partially fiber composite material, a preform of the rim base made of fibrous material is connected with the wheel disk prior to consolidation.

The marginal areas of the wheel disk specially formed for the connection are partly expensive to manufacture or must be draped with significant cost prior to the fiber deposition process to prefabricate the preform of the rim base in order to be laid to the mold.

Furthermore, it has been often found that additional expenditure is required to the previously known undercut connections of rim base and wheel disk in order to achieve a sufficient adhesive bond of the rim base with the wheel disk during the subsequent consolidation of the preform of the wheel rim.

It is therefore the objective of the invention to improve the connection between the rim base and the wheel disk at a wheel rim of the aforementioned type and to provide a method for manufacturing a wheel rim with an improved connection between the rim base and wheel disk.

SUMMARY OF THE INVENTION

The objective is achieved by a wheel rim according to a first embodiment of the present invention as set forth in the instant claims. It is suggested according to the invention that the radial marginal area of the wheel disk has at least two partial layers, on each of which a substantially axially extended, contoured joint zone is formed, which is flat connected to the rim base. In this solution, the wheel disk has two or more partial layers in its marginal area, which result in a pronounced flat expansion as joint zone, when opened like a fan. Such partial layers in the wheel disk's marginal area can be easily manufactured, for example, by splaying the outer circumference of the wheel disk. Alternatively, another layer can be added at the wheel disk's marginal area, which is glued at the extension with the material of the wheel disk. The joint zones of the partial layers can be made as large as desired and therefore spread apart as far as desired.

Large joint zones especially adapted to the uneven contour of the rim base can be made available with these joint areas formed from the partial layers. The contoured joint zones provide a large surface contact in a simple way and a mold closing formed by the contouring next to a radially secured mold closing by the comprehensive integration of the wheel disk into the rim base also in the axial direction. The combination of these properties improves significantly the connection adhesion. The contoured adjacent joint areas ensure right before any consolidation of the fiber-reinforced plastic of the rim base an effective axial and radial tight fit and a friction fit between the wheel disk and the rim base preform. Upon consolidation of the rim base, the large-scale joint zones provide an effective integral connection between the rim base and the wheel disk.

Due to the advantageous formation of the marginal area, which inevitably develops in the form of an interspace at the extension of the spread apart arranged partial layers, a particularly pronounced undercut connection is enabled with the rim base and the preform of the rim base and thus ensures a more effective tight fit in a simple manner between the wheel disk and the rim base.

As a result, a heavy-duty, tight fitted and integral connection of the wheel disk with the rim base of the wheel rim is created by simple means.

The invention is applicable to both a closed flat wheel disk as well as to a wheel disk with a broken through shape in the marginal area. The term of a wheel disk also includes a wheel spider formed by spokes, in which the invention is also applicable.

The objective is also achieved by a wheel rim according to a second embodiment of the present invention as set forth in the instant claims. In this case it is suggested that the wheel disk consists of at least two, contiguously arranged, partial layers, on each of which a substantially axially extended, contoured joint zone is formed in the marginal area, which is flat connected to the rim base. In this invention design, the wheel disk consists of two or more partial layers. In the marginal area, these partial layers are opened like a fan and thus result in a pronounced flat expansion as joint zone. Large and especially well-formed joint areas adapted to the uneven contour of the rim base can be made available also with the joint zones formed from these partial layers. As a result, the above-described advantages can be obtained also with this solution, wherein the manufacture of the fanned out joint zones is much easier to realize. Because with this solution, the layer structure formed by partial layers of the wheel disk is used directly for the formation of joint zones, so that separate operational steps for the manufacture of special partial layers in the marginal area of the wheel disk can be omitted.

The layer structure of wheel disk according to the invention may also ensure higher stability of the wheel disk.

The wheel disk's layer structure offers advantageous combination possibilities, e.g. in terms of material properties, thickness, course and connections of each partial layer with which the wheel disk itself can be adapted to the rim base at the respective operating conditions of the wheel rim like the connection of the wheel disk. Thus, support and joint areas differentiated in terms of size and thickness are made available according to the respective requirements for the degree of loading of the wheel rim on the connecting seam with the rim base or the preform of the rim base.

In an advantageous design, the partial layers are at least in sections materially connected to one another.

This makes it easier both for the technological process of the prefabrication of the wheel disk and the preform of the rim base assembled to the wheel disk. On the other hand, the layer-wise material connection of the partial layers provide for the improved stability of the wheel disk itself.

Further advantages arise when the joint zone of the partial layer is formed discontinuously in the peripheral direction of the wheel disk. Thereby tangentially directed undercuts between the joint zones and the adjacent contour of the rim base or the preform of the rim base are additionally enabled, thus ensuring a further advantageous tight fit of the marginal area of the wheel disk with the rim base.

In a particularly preferred embodiment, a profiled support core is located between the joint zones of two partial layers. The support core is especially inserted into the formed interspace of the partial layers spread apart from one another. The support core fixes the spread joint zones during the prefabrication of the preform of the rim base and the connection of the joint zones with the rim base. The layer fixation of the joint zones of the partial layers by means of the support core prevents displacement and buckling during forming of the partial layers on the mold and the depositing process of the fibrous material of the rim base preform on the partial layers.

In addition, the support core improves the stability of the finished undercut connection between the wheel disk and the rim base.

A form of the support core adapted to the formed interspace increases these above-mentioned advantageous effects.

The profiled supporting core may consist of any solid material, with PU rigid foam or other hard plastic as well as metal or ceramic being particularly suitable.

According to one embodiment of the invention, it can be provided that there is at least a partial layer of the wheel disk made of fiber composite material, steel sheet or aluminum sheet.

Should partial layers made of different materials be provided, functional and creative effects can be combined as required. Thus, a protective layer of the wheel disk can be prepared with a metallic partial layer, such as for example made of aluminum sheet or sheet steel, which protects a neighbouring partial layer consisting for example of fiber composite material for lightweight purposes, against thermal or mechanical influences. Also special design requirements for wheel disk can be realised with appropriate material selection. The use of fiber composite material for the partial layer also makes it possible to provide locally customised reinforcing structures, according to differentiated mechanical and thermal loads on the wheel disk, made e.g. of fiber glass or high-strength carbon fibers, for example, in the marginal area.

Advantageously, a partial layer of fiber composite material can be formed from several textile fiber layers, ensuring this way an extremely high power transmission in the fiber direction with light weight at the same time.

The objective is also achieved by a method for manufacturing the wheel rim according to the invention as set forth in the instant claims. In the method according to the invention, in a pre-production phase to produce a preform of the rim base by depositing fibrous material on a mold reproducing the rim base, the wheel disk or the partial layers of the wheel disk are arranged between two part tools of the mold and the sections of partial layers sticking out over the partial tools formed on the part tools, with the formed sections of the partial layers being in essence axially stretched, form contoured joint zones, which are fixed by subsequent deposition of the fibrous material in tight fit at the preform of the rim base.

In the area between the part tools of the mold, the partial layers of the wheel disk are fixed and joined to one another, while in the radial marginal area of the wheel rim the projecting partial layers are oppositely spread and laid as joint zones on both sides of the contour of the enclosing part tools. The part tools represent the future shape of the rim base. In this way, the joint zones of the partial layers of the wheel disk can be prepared into the desired position and shape with respect to the rim base before the fiber deposition process is carried out on the mold for the pre-fabrication of the rim base preform. Then interfaces are created with the fiber deposition with large, contoured undercuts at the contact surfaces between the wheel disk and the preform of the rim base, which significantly improve the adhesion of the connection. The design ensures, even before the subsequent consolidation, an effective tight and frictional fit between the wheel disk and the preform of the rim base.

Between the joint zones of two partial layers molded on the part tools an interspace is inevitably formed, so that a particularly pronounced undercut connection of the fibrous material of the rim base or the preform of the rim base with the wheel disk may arise by itself during the fiber deposition process. In addition to the effective frictional fit surface adhesion of the joint zones on the preform of the rim base, a secure tight fixing of the wheel disk is achieved, which facilitates further processing of the assembled preform. With the consolidation of the preform, a particularly effective, combined tight fit and integral connection of the wheel disk is created with the rim base.

If a profiled support core is inserted before the fiber deposition process for fiber deposition on the mold in an interspace between the partial layers molded on the part tools, the joint zones will be particularly well fixed in position on the part tools. The inserted support core prevents the formation of folds and wrinkles, when molding the partial layers on the mold and during the subsequent deposition process of the fibrous material.

In a preferred implementation, the wheel disk or at least one partial layer of the wheel disk is prefabricated as a preform of fibrous material and such a preform is arranged between the part tools of the mold. In such an implementation, the wheel disk or the partial layer of the wheel disk, similar to the preform of the rim base after completion of fiber deposition on the mold, is a not yet consolidated semifinished product. The consolidation of the preform of the wheel disk and the partial layer of the wheel disk can thus take place simultaneously with the consolidation of the preform of the rim base.

The partial layers of the wheel disks can also be likewise integrally connected to one another as well as the partial layers with the rim base for savings of production engineering.

In a wheel disk with a partial layer attached in the marginal area, a partial layer pre-built as preform in the desired arrangement can be fixed to the wheel disk or to the preform of the wheel disk between the part tools and can be glued during the consolidation process at the joint extension with the wheel disk.

These and other features emerging from the patent claims, the description of the working examples and the drawings may each be implemented individually or in combination as advantageous embodiments of the invention, for which protection is claimed.

BRIEF DESCRIPTION OF THE DRAWINGS

The wheel rim according to the invention and the process for their manufacture are described in greater detail using a working example. the accompanying drawings show in schematic illustration in FIG. 1 Sectional view of a wheel rim with a rim base and a wheel disk having a two-part marginal area, FIG. 2 Sectional view of a wheel rim with a rim base and a two-piece wheel disk, FIG. 3 Detail view x of the wheel rim in FIG. 2, FIG. 3*a*. Detail view of alternate embodiment of the wheel rim of FIG. 2, FIG. 4 Sectional view of a wheel rim with a rim base and a five-piece wheel disk, FIG. 5 Detail view y of the wheel rim in FIG. 4, and FIG. 6 Flow diagram of the method for manufacturing the wheel rim according to the invention.

Detail view of alternative embodiment of the wheel rim of FIG. 2,

DETAILED DESCRIPTION OF THE INVENTION

Figure 1:
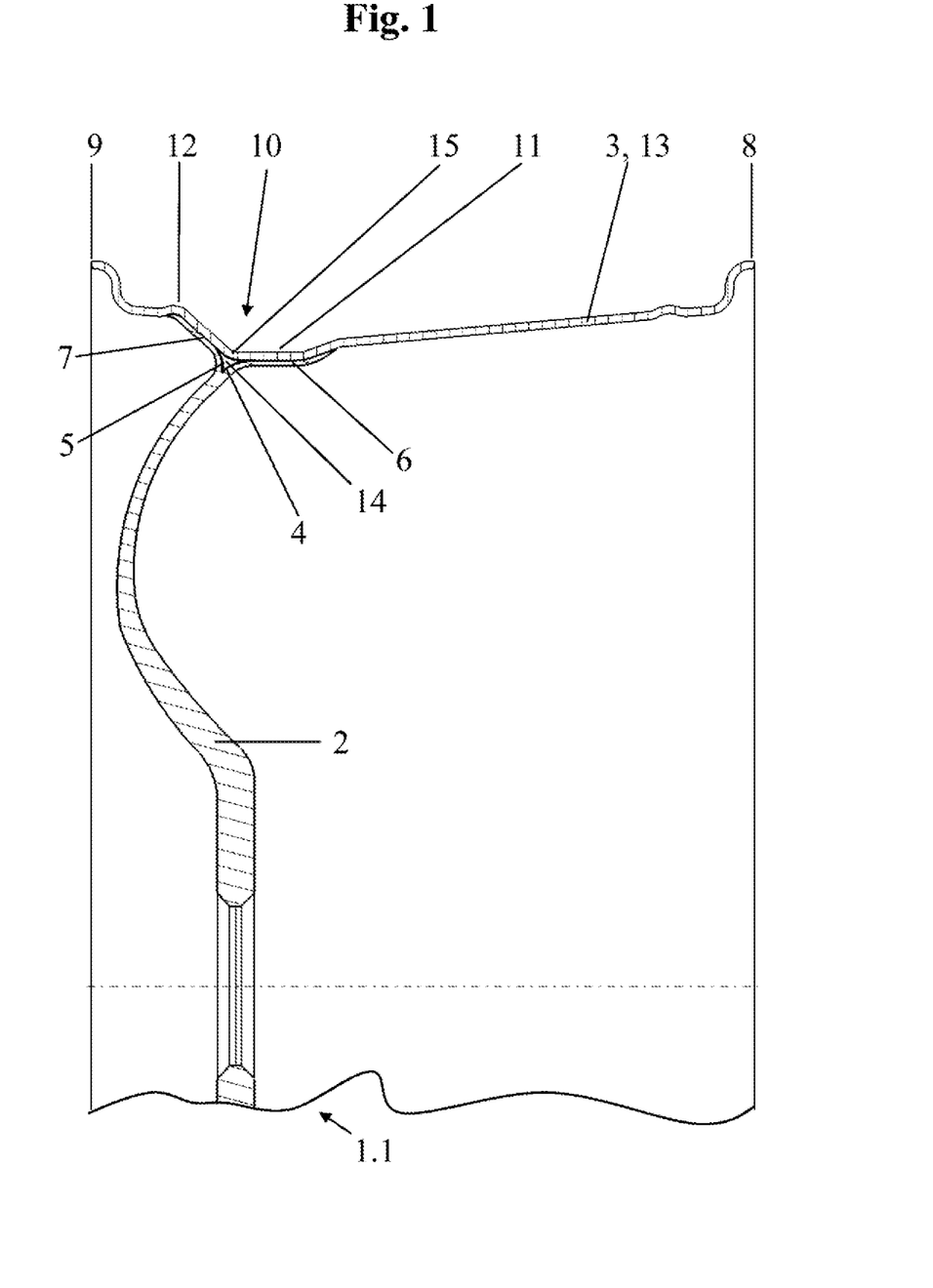

FIG. 1 shows a wheel rim 1.1 according to the invention as per a first implementation example, consisting of a closed flat wheel disk 2 made of the carbon fiber-reinforced plastic and a rim base 3 made of the carbon fiber-reinforced plastic. The wheel disk has in its peripheral marginal area two partial layers 4, 5 made of carbon fiber-reinforced plastic. The two partial layers 4, 5 are formed for example by a peripheral longitudinal section in the carbon fiber-reinforced plastic along the marginal area of wheel disk 2.

These partial layers 4, 5 are basically extending axially in contrast to the mainly radially extending wheel disk body and are arranged spread apart in opposite directions to one another. They each have a joint zone 6, 7, which is in sequentially contact with the contour of the rim base of the wheel rim on rim base 3 and is connected thereto. Joint zone 6 of the inner partial layer 4 extends in the direction of an inner rim flange 8 of rim base 3, whereas joint zone 7 of the outer partial layer 5 extends toward an outer rim flange 9 of rim base 3. Joint zones 6, 7 of partial layers 4, 5 are in contact with their distinct contact areas over the entire surface and in accordance with the contour on the contour of rim base 3. Joint zones 6, 7 are connected to rim base 3 along a circumferential connecting seam 10. The connecting seam 10 is formed in an area of the rim base, in which the contour of rim base is particularly profiled pronounced. The connecting seam 10 is located in the area of a constricting shaped well 11, on which a molded hump 12 is connected towards an outer rim flange 9 and a flatbed 13 of the rim base 3 towards an inner rim flange 8.

In a resulting interspace 4 between the spread-out partial layers 4, 5 of wheel disk 2, well 11 is additionally formed by a beading 15. The axial cross-sectional profile of the peripheral connecting seam 10 along rim base 3 from hump 12 over well 11 with beading 15 through flatbed 13 achieves an undercut connection with axial and radial form closure between wheel disk 2 and rim base 3. Joint zones 6, 7 of partial layers 4, 5 are also integrally, e.g. by gluing, bonded with rim base 3.

The method for manufacturing the wheel rim 1.1 in accordance to the invention, in particular the connection between rim base 3 and wheel disk 2 can take place during the manufacture of a preform of rim base 3 by means of fiber deposition on a mold reproducing rim base 3 (not shown here). Wheel disk 2 is additionally placed between two part tools of the mold, wherein the marginal area of both partial layers 4, 5 projects beyond the mold. Partial layers 4, 5 are flat formed on each part of the tool on both sides of the mold, so as to form interspace 14 between the spread apart partial layers 4, 5 of interspace 14 and joint zones 6, 7 form an almost transition-free connection to the part tools. Following this, for the manufacture of the preform of rim base 3, the fibrous material is placed on the mold and on interspace 14 and the contoured joint zones 6, 7 of partial layers 4, 5.

During this fiber deposition process for manufacturing the preform of rim base 3 a large undercut connection with axially and radially secured tight fit is formed between wheel disk 2 and the preform of rim base 3 of fibrous material at connecting seam 10 by the form of interspace 14 and contoured joint zones 6, 7.

This tight fit is supported by a high friction fit of the large contact areas between joint zones 6, 7 of wheel disk 2 and the contour of preform of rim base 3. This way a prefixed connecting seam 10 of wheel disk 2 is created with the preform of rim base 3 for optimal processing even at this stage of manufacture.

In the subsequent consolidation process for consolidating the preform of rim base 3, for example by resin injection, wheel disk 2 and rim base 3 are fused and/or resinified together at the same time in the support area of the fibrous material of the preform (interspace 14 and contoured joint zones 6, 7). Thus, during this consolidation process, the joining process that began in the pre-production phase to form the preform for connecting wheel disk 2 to rim base 3 is completed. Both processes are completed in a manufacturing process economically in terms of manufacturing technology.

In an alternative implementation of the first implementation example, wheel disk 2 described above is connected as a prefabricated semi-finished product or preform made of fibrous material to rim base 3.

Wheel disk 2 is arranged as preform between the part tools of the mold. Partial layers 4, 5 formed by partially fanning the outer edge of wheel disk 2 preform are easier to form and can be better molded to the mold. During consolidation of wheel disk 2, the extension of spliced partial layers 4, 5 can also be tightly joined. In particular, the consolidation of wheel disk 2 preforms can be performed simultaneously with the process of consolidation of rim base 3 preform, wherein a further manufacturing step for manufacturing the wheel rim 1.1 according to the invention can be omitted.

Figure 2:
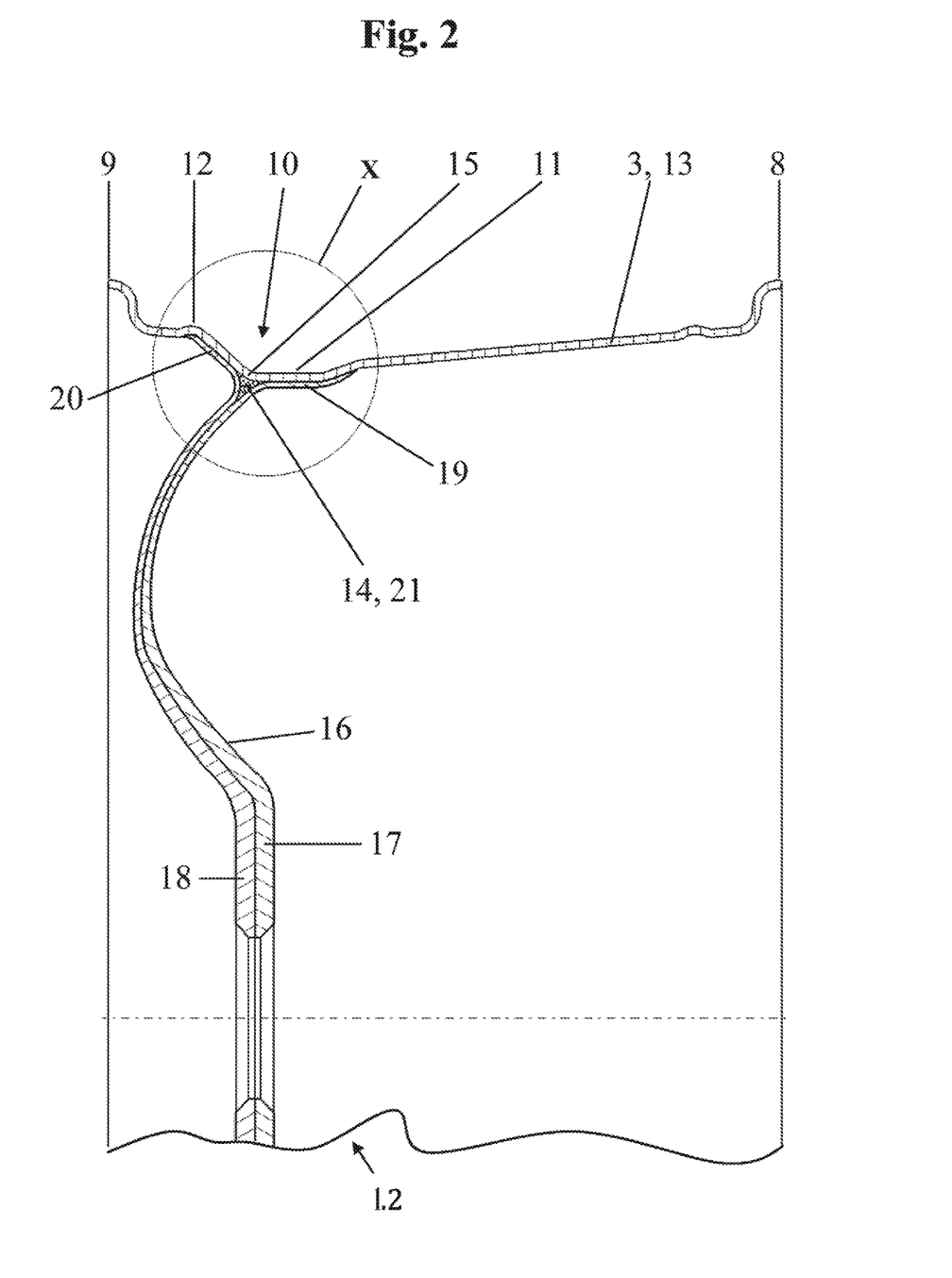

FIG. 2 shows a wheel rim 1.2 according to the invention as per a second implementation example, consisting of a two-part wheel disk 16 and a rim base 3.

The same functional elements are designated with identical reference numerals. Here we will basically discuss only the differences from wheel rim 1.1 according to the first implementation example. Also with regard to the explanation of the method steps and function features according to the invention, reference is made to the above description for the first implementation example.

As a special feature of this implementation example, wheel disk 16 is formed in two parts and consists of two joined partial layers 17, 18. Partial layers 17, 18 are axially oriented in the marginal area of wheel disk 16 and are spread in opposite directions and each has a joint zone 19, 20, which like in the implementation example comes in full contact with the contour of rim base 3 of wheel rim 1.2 according to FIG. 1.

Rim base 3 is made of carbon fiber-fiber composite material. The inner partial layer 17 and the outer partial layer 18 of wheel disk 16 are also made of carbon fiber-fiber composite material.

Joint zones 19, 20 of partial layers 17, 18 are connected to rim base 3 in the area of well 11 in transition to hump 12 and to flatbed 13. Joint zone 19 of the inner partial layer 17 laid at rim base 3 extends towards the inner rim flange 8, whereas joint zone 20 laid at rim base 3 of the outer partial payer 18 extends toward the outer rim flange 9.

A profiled circular support core 21 made of PU rigid foam is arranged in the interspace 14 formed circumferentially between the partial layers 17,18 of wheel disk 16 spread in the marginal area. Support core 21 is accurately adapted to the contour of the divergent partial layers 17, 18. Thus, the support core 21 fills interspace 14 in the proper form. At the upper end, the support core 21 supports the contour of rim base 3 in such a way that still a beading is formed.

The circular support core 21 ensures a precise fit of joining zones 19, 20 molded on the part tools during the production of connection between rim base 3 and the preform of rim base 3 and of wheel disk 16. The support core 21 improves accuracy of connecting seam 10 for connecting wheel disk 16 to rim base 3, thus ensuring form stability of tight fit undercut connection. Support core 21 also increases stability of this connection.

Figure 3:
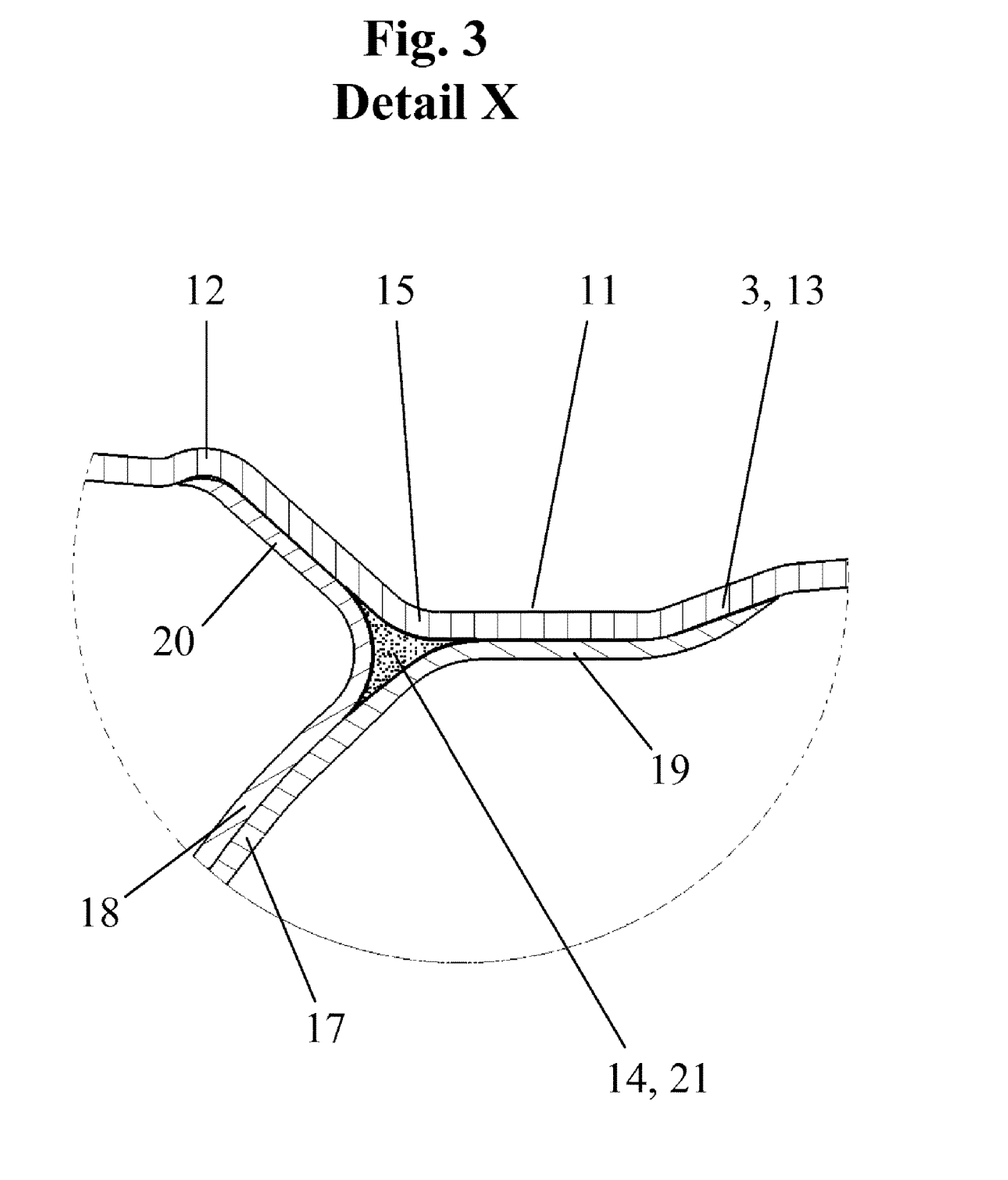
Figure 3A:
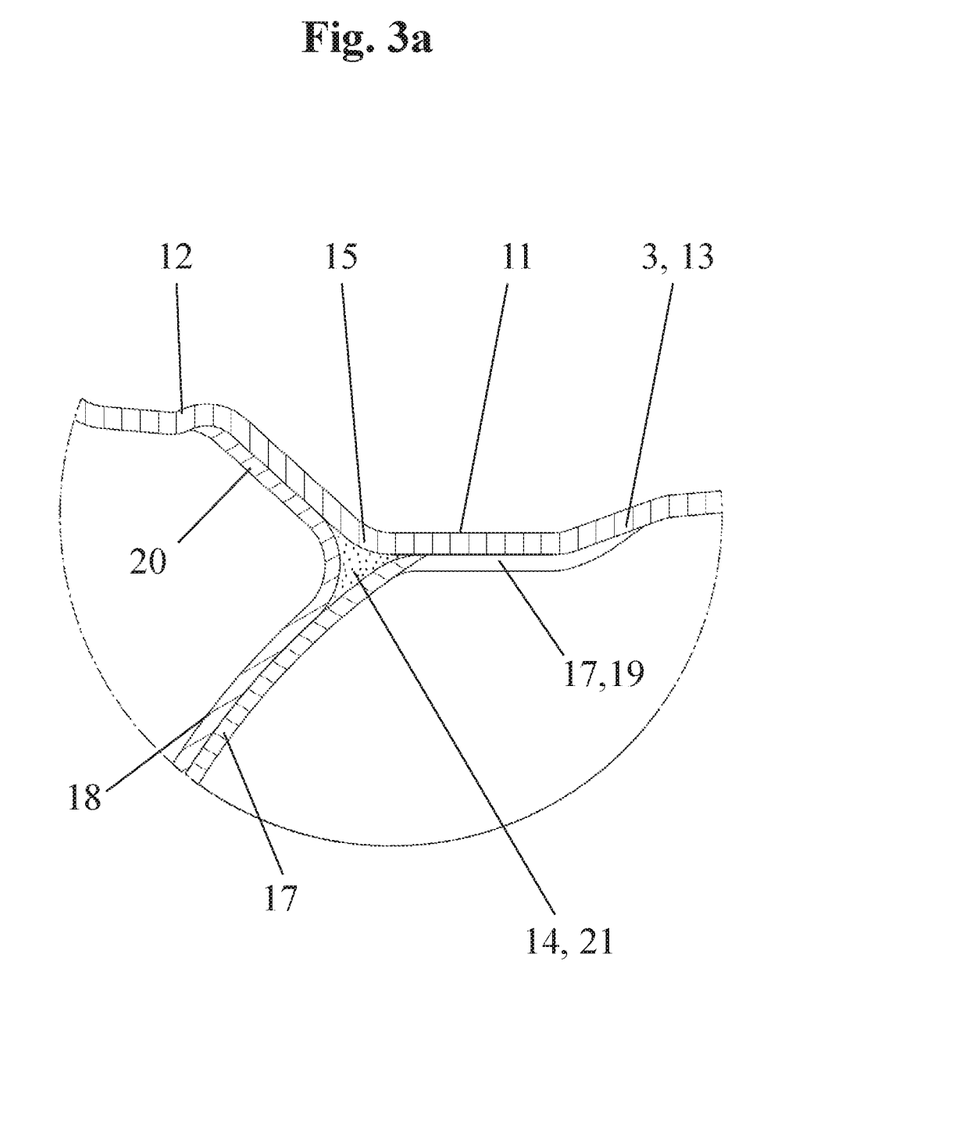

The circumferential connecting seam 10 with support core 21 is marked as Detail X and is shown in an enlarged sectional view of FIG. 3.

In accordance to the process according to the invention the preforms of partial layers 17, 18 consisting of fibrous material are arranged laid together between the part tool of the mold not shown here, in preparation of the fiber deposition process for producing the preform of rim base 3. The marginal areas of the preforms of partial layers 17, 18 protruding over the part tools are folded apart and formed as joint zones 19, 20 on both sides of the mold, each attached to a part tool to meet the contour. In peripheral marginal area of wheel disk 16 in the transition to joint zones 19, 20 the peripheral interspace 14 is inevitably formed, into which the profiled circular support core 21 is inserted.

During this fiber deposition process for manufacturing the preform of rim base 3 a large undercut connection with axially and radially secured tight fit is formed between wheel disk 16 and rim base 3 at connecting seam 10 by the form of support core 21 and contoured joint zones 19, 20 of preforms of partial layers 17, 18.

With the consolidation of the preform of rim base 3, the adjoining, impregnated with adhesive, preforms of partial layers 17, 18 of wheel disk 16 are at the same time glued together and solidified. In the area of peripheral connecting seam 10, joining zones 19, 20 are at the same time solidified and adhered to the material of support core 21 and the fibrous material of rim base 3.

Partial layers 17, 18 made of carbon fiber-fiber composite material joined layer-wise increase the stability of wheel disk 16, and consequently the stability of wheel rim 1.2 with similar low weight.

Figure 4:
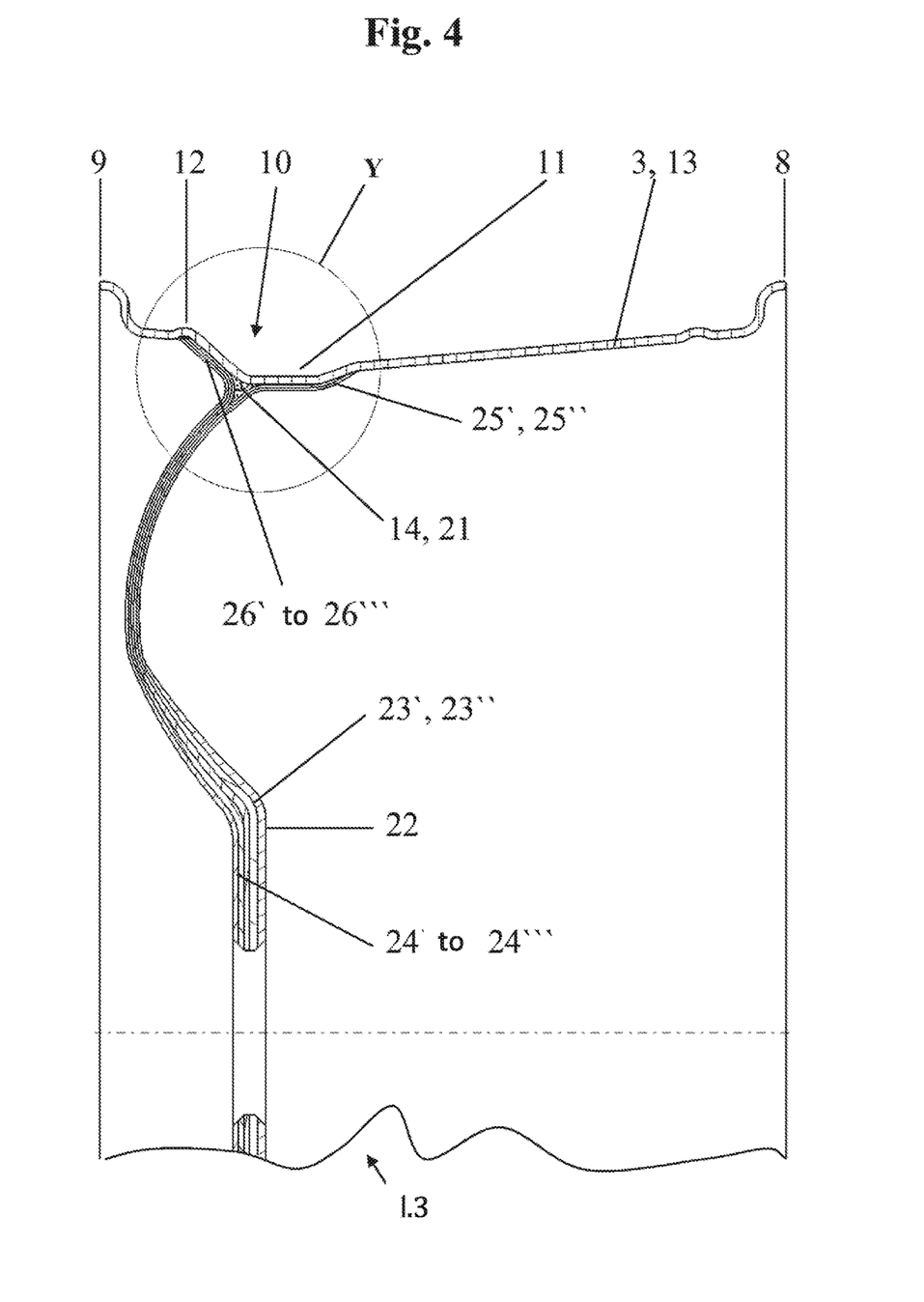
Figure 5:
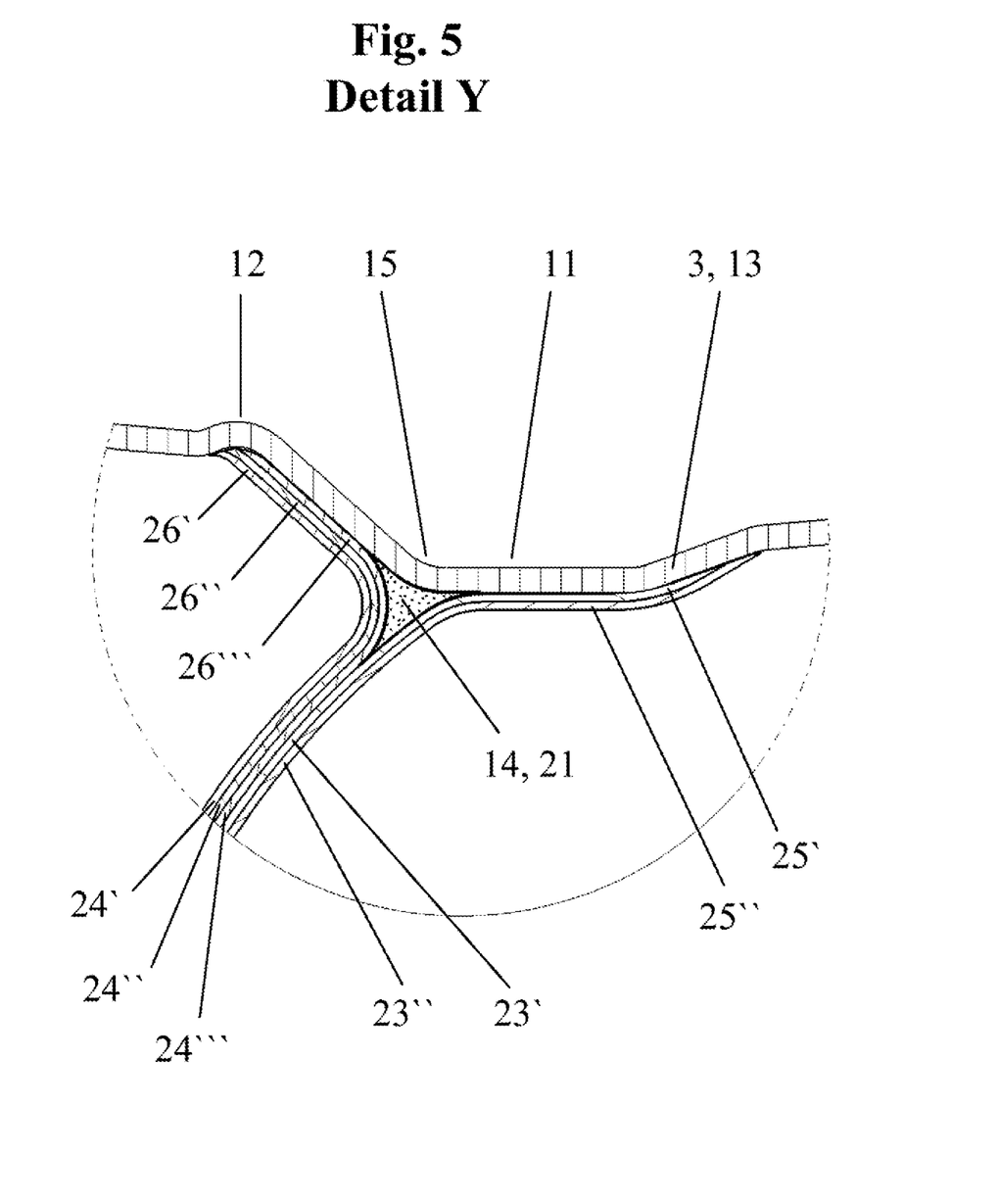
Figure 6:
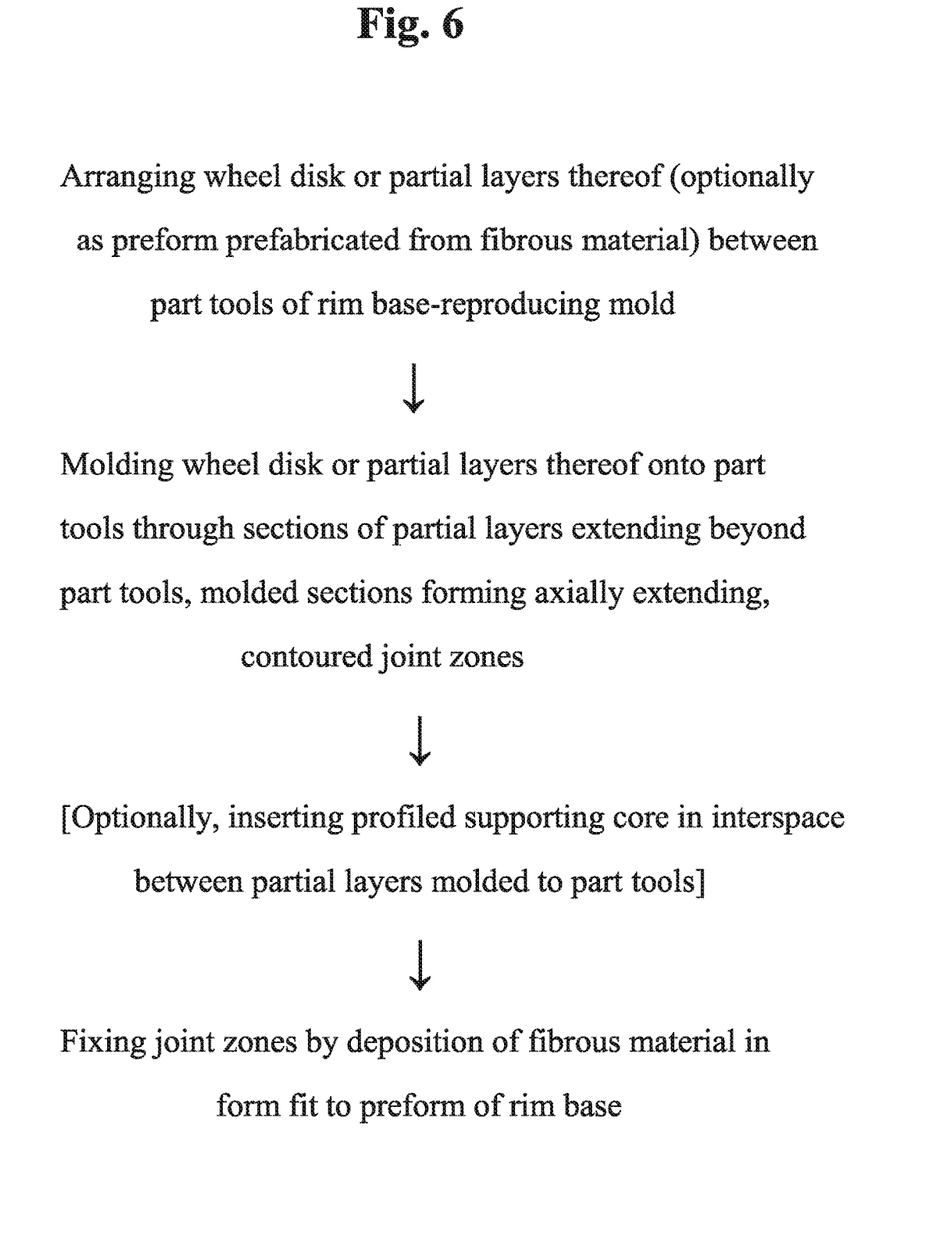

FIGS. 4 and 5 show a further wheel rim 1.3 according to the invention, in accordance to a third implementation example, consisting of a five-piece wheel disk 22 in conjunction with rim base 3. The same functional elements are designated with identical reference numerals. Here we will basically discuss only the differences to wheel rims 1.1 and 1.2 according to the preceding implementation example. With regard to the explanation of the method steps and function features, reference is also made to the above description of the implementation example.

In this implementation example, the wheel disk 22 comprised of a total of five partial layers, two inner partial layers 23', 23" and three outer partial layers 24' to 24'''. The inner partial layers 23', 23" and outer partial layers 24' and 24''' are arranged in opposite directions fanned on the circumferential connecting seam 10 between wheel disk 22 and rim base 3 to one another and each has a joint zone 25', 25" and 26' to 26'''.

This arrangement of the peripheral connecting seam 10 can be seen particularly well from Detail Y shown in FIG. 5 as an enlarged sectional view.

Partial layers 23', 23" and of 24' to 24''' are within a primary radial portion of the wheel disk 22 compactly combined in five layers to one another and are arranged separated in the marginal area of the wheel disk in bundles of two and three partial layers 23', 23" and 24' to 24'''. The two inner partial layers 23', 23" are arranged in the direction of the inner rim flange 8 and the three outer partial layers 24' to 24''' are arranged in the direction of the outer rim flange 9.

The associated joint zones 25', 25" and 26' to 26''' of partial layers 23', 23" and 24' to 24''' come in contact with the contour of rim base 3 at the laid well 11 in the transition to hump 12 of rim base 3, wherein only one joint zone 25' and 26''' is directly connected to the rim base.

In the circulating interspace 14, which is formed between the separated partial layers 23', 23" and 24' to 24''' in the transition to joint zones 25' and 26", an accurately profiled, circular support core 21 is arranged similarly to the preceding implementation example.

The two inner partial of 23', 23" are made of carbon fiber-reinforced plastic. Of the three outer partial layers 24' to 24''' the most extremely situated partial layer 24' is made of aluminium sheet, whereas the partial layers 24", 24''' are also made of carbon fiber-fiber composite material.

In accordance to the invention process four preforms of partial layers 23', 23", 24", 24''' consisting of fibrous material and partial layer 24' of aluminum sheet are arranged in layers between the part tools of the mold not shown, in preparation of the fiber deposition process for producing the preform of rim base 3. The layers 23', 23" and 24' to 24''' projecting beyond the part tools in the marginal area are according to the above-described separation disengaged from one another and spread apart and molded as joint zones 25', 25" and 26' to 26''' on both sides of the part tool. Spreading and molding takes place among other things with the help of the support core 21 inserted in interspace 14.

During the fiber deposition process for producing the preform of rim base 3, an undercut connection is formed in the area of the support core 21 and the molded joining zones 25', 25" and 26' to 26'''. As in the preceding implementation example, the large undercut connection in addition to the axially and radially secured tight fit provides a very large contact surface for the subsequent integral connection between the wheel disk 22 and rim base 3.

The adjacent, impregnated with glue, preforms of partial layers 23', 23", 24", 24''' of wheel disk 22 are glued together and solidified during the consolidation of preform of rim base 3. At the same time the outer partial layer 24' made of aluminium sheet is connected with partial layer 24". In the area of the peripheral connecting seam 10, joint zones 25', 25" and 26", 26''' of partial layers 23', 23" and 24", 24''' are solidified and glued together and glued to the material of the support core 21 and the fibrous material of rim base 3.

Partial layers 23', 23", 24", 24''' made of carbon fiber-fiber composite material ensure through plural, laminar bonding with low weight at the same time, particularly high stability of wheel disk 22 and thus of wheel rim 1.3.

Furthermore, partial layer 24' made of aluminum sheet forms an outer protective layer of wheel disk 22, by protecting it from the outside in particular by the adjacent partial layer 24" made of carbon fiber-fiber composite material against mechanical influences, such as by falling rocks.

LIST OF REFERENCE NUMERALS

1 Wheel rim .1, .2, .3
2 Wheel disk
3 Rim base
4 inner partial layer of the marginal area of the wheel disk
5 outer partial layer of the marginal area of the wheel disk
6 Joint zone of the inner partial layer
7 Joint zone of the outer partial layer
8 inner rim flange
9 outer rim flange
10 Connecting seam
11 Well base of the rim base
12 Hump of the rim base
13 Flat base of the rim base
14 Interspace
15 Beading
16 two-piece wheel disk
17 inner partial layer of the two-piece wheel disk
18 outer partial layer of the two-piece wheel disk
19 Joint zone of the inner partial layer
20 Joint zone of the outer partial layer
21 profiled support core, circular support core
22 five-piece wheel disk
23 inner partial layer of the five-piece wheel disk ' to "
24 outer partial layer of the five-piece wheel disk ' to '''
25 Joint zone of the inner partial layer ' to "
26 Joint zone of the outer partial layer ' to '''

What is claimed is:

1. A wheel rim, comprising:
a rim base of fiber composite material, and
a wheel disk connected to the rim base at a radial marginal area, and wherein
the wheel disk is present as a single piece and only the marginal area of the wheel disk comprises at least two partial layers on each of which a substantially axially extending, contoured joint zone is formed, the at least two joint zones together being connected to the rim base in a substantially entire area of a drop center of the rim base and conforming to a contour of the rim base in the substantially entire area of the drop center,
and wherein:
a joint zone of a partial layer is present in interrupted form in circumferential direction of the wheel disk.

2. The wheel rim of claim 1, wherein the at least two partial layers are integrally connected to one another at least in sections thereof.

3. The wheel rim of claim 1, wherein a profiled supporting core is arranged between joint zones of two partial layers.

4. The wheel rim of claim 1, wherein at least one partial layer of the wheel disk consists of steel sheet or aluminum sheet.

5. The wheel rim of claim 1, wherein at least one partial layer of the wheel disk consists of fiber composite material formed from of a plurality of textile fiber layers.

6. The wheel rim of claim 1, wherein the at least two partial layers of the marginal area of the wheel disk are produced by splicing of an outer circumference of the wheel disk.

7. The wheel rim of claim 1, wherein the at least two partial layers of the marginal area of the wheel disk are produced by adding another layer at the marginal area of the wheel disk, which layer is glued at an extension of a material of the wheel disk.

8. The wheel rim of claim 1, wherein the wheel disk is present as a wheel spider formed by spokes.

9. A wheel rim, comprising:
a rim base of fiber composite material; and
a wheel disk connected to the rim base at a radial marginal area, the wheel disk comprising:
at least two partial layers which are arranged close together in certain areas and on each of which in a marginal area thereof a substantially axially extending, contoured joint zone is formed, the at least two joint zones together being connected to the rim base in a substantially entire area of a drop center of the rim base and conforming to a contour of the rim base in the substantially entire area of the drop center; and
a joint zone of a partial layer present in interrupted form in a circumferential direction of the wheel disk.

10. The wheel rim of claim 9, wherein the at least two partial layers are integrally connected to one another at least in sections thereof.

11. The wheel rim of claim 9, wherein a profiled supporting core is arranged between joint zones of two partial layers.

12. The wheel rim of claim 9, wherein at least one partial layer of the wheel disk consists of steel sheet or aluminum sheet.

13. The wheel rim of claim 9, wherein at least one partial layer of the wheel disk consists of fiber composite material formed from of a plurality of textile fiber layers.

14. The wheel rim of claim 9, wherein the wheel disk is present as a wheel spider formed by spokes.

15. A method of manufacturing a wheel rim which comprises a rim base of fiber composite material and a wheel disk, the wheel disk being connected to the rim base at a radial marginal area, wherein
(a) the wheel disk is present as a single piece and only the marginal area of the wheel disk comprises at least two partial layers on each of which a substantially axially extending, contoured joint zone is formed, the at least two joint zones together being connected to the rim base in a substantially entire area of a drop center of the rim base and conforming to a contour of the rim base in the substantially entire area of the drop center, or
(b) the wheel disk comprises at least two partial layers which are arranged close together in certain areas and on each of which in a marginal area thereof a substantially axially extending, contoured joint zone is formed, the at least two joint zones together being connected to the rim base in a substantially entire area of a drop center of the rim base and conforming to a contour of the rim base in the substantially entire area of the drop center;
wherein the method comprises in a pre-production phase for forming a preform of the rim base by fiber deposition on a mold that reproduces the rim base:
arranging the wheel disk or the partial layers of the wheel disk between two part tools of the mold,
which wheel disk or partial layers are molded onto the part tools through sections of partial layers which extend beyond the part tools, molded sections of partial layers substantially forming axially extending, contoured joint zones, which are fixed by subsequent deposition of fibrous material in form fit to the preform of the rim base.

16. The method of claim 15, wherein prior to the fiber deposition a profiled supporting core is inserted in an interspace between the partial layers which are molded onto the part tools.

17. The method of claim 15, wherein a preform of the wheel disk prefabricated from fibrous material or at least a preform of the partial layer prefabricated from fibrous material is arranged between the part tools of the mold.

* * * * *